United States Patent
Sakata et al.

(10) Patent No.: US 11,619,923 B2
(45) Date of Patent: Apr. 4, 2023

(54) DIGITAL TWIN MANAGEMENT SYSTEM AND METHOD

(71) Applicant: Hitachi, Ltd., Tokyo (JP)

(72) Inventors: Masayuki Sakata, Tokyo (JP); Yoshinari Hori, Tokyo (JP); Daisuke Ito, Tokyo (JP); Toshihiko Kashiyama, Tokyo (JP); Taisuke Ueta, Tokyo (JP); Masaaki Iwasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/709,611

(22) Filed: Mar. 31, 2022

(65) Prior Publication Data

US 2022/0326680 A1    Oct. 13, 2022

(30) Foreign Application Priority Data

Apr. 8, 2021 (JP) .............................. JP2021-066071

(51) Int. Cl.
G05B 19/4069 (2006.01)
(52) U.S. Cl.
CPC .................. G05B 19/4069 (2013.01); *G05B 2219/32017* (2013.01)
(58) Field of Classification Search
None
See application file for complete search history.

(56) References Cited

U.S. PATENT DOCUMENTS

| 10,274,915 B2 | 4/2019 | Lovett et al. |
| 2014/0019104 A1 | 1/2014 | Martinez Canedo et al. |
| 2021/0374032 A1* | 12/2021 | Rakshit ............... G06F 11/3457 |

FOREIGN PATENT DOCUMENTS

JP    2012-160014 A    8/2012

* cited by examiner

*Primary Examiner* — Ryan A Jarrett
(74) *Attorney, Agent, or Firm* — Crowell & Moring LLP

(57) ABSTRACT

A digital twin management system manages a virtual model that represents an actual physical system in a virtual space on a real-time basis. To generate an integrated virtual model by adding a second virtual model to a first virtual model, a processor of the digital twin system extracts multiple parts that can be used in common in the first virtual model and the second virtual model, generates multiple integrated virtual models that are candidates of an integrated virtual model by changing the extracted parts that can be used in common, calculates an evaluation of each of the generated integrated virtual models, and outputs configuration information regarding each of the integrated virtual model candidates and an evaluation of the integrated virtual model candidate in association with each other.

11 Claims, 19 Drawing Sheets

FIG.4

| APPARATUS MANAGEMENT DB T1 | | | | | |
|---|---|---|---|---|---|
| C11 | C12 | C13 | C14 | C15 | C16 |
| ASSET ID | APPARATUS NAME | MODEL | CONFIGURATION INFORMATION | INSTALLATION SITE | INSTALLATION DATE |
| MC-001 | CUTTING APPARATUS 001 | M001 | INDUSTRIAL MOTOR A (IM-001 MODEL, NUMBER OF MOTORS: 1) | FACTORY A-Line A | 2018/1/1 |
| MC-002 | CUTTING APPARATUS 002 | M001 | INDUSTRIAL MOTOR A (IM-001 MODEL, NUMBER OF MOTORS: 1) | FACTORY A-Line B | 2018/1/1 |
| ... | ... | ... | ... | | |

FIG. 5

| | C21 | C22 | C23 | C24 | C25 | C26 | C27 |
|---|---|---|---|---|---|---|---|
| | DTID | NAME | TARGET APPARATUS ID | META-INFORMATION | MONITORING INFORMATION | CONFIGURED SCENARIO INSTANCE | DIGITAL TWIN-RELATIONSHIP INFORMATION |
| | DT-001 | CUTTING APPARATUS DIGITAL TWIN 001 | MC-001 | Model:CM-001 S/N:CM-001-001 INSTALLATION 2018/1 | D-001 | SCI-001 | DT-003 (Child) |
| | DT-002 | CUTTING APPARATUS DIGITAL TWIN 002 | MC-002 | Model:CM-001 S/N:CM-001-002 INSTALLATION 2018/1 | D-001, D-002 | SCI-002 | DT-004 (Child) |
| | DT-003 | INDUSTRIAL MOTOR DIGITAL TWIN 001 | MC-001 | Model:IM-001 S/N:IM-001-001 | D-001, D-002, D-003, D-004, D-005 | SCI-001 | DT-001 (Parent) |
| | DT-004 | INDUSTRIAL MOTOR DIGITAL TWIN 002 | MC-002 | Model:IM-001 S/N:IM-001-002 | D-001, D-002, D-003, D-004, D-005 | SCI-002 | DT-002 (Parent) |

DIGITAL TWIN CONFIGURATION DB T2

FIG. 6

| # | NAME | MID | TYPE | SCENARIO ID | INPUT PARAMETER | OUTPUT PARAMETER | SETTING PARAMETER |
|---|------|-----|------|-------------|-----------------|------------------|-------------------|
| | | C31 | C32 | C33 | C34 | C35 | C36 | C37 | C38 |
| 1 | NM1 | M-01 | MT1 | SC-001 | RS-01 | VS-01 | HPF (5kHz) |
| 2 | NM2 | M-02 | MT2 | SC-001 | VS-01 | VS-02 | N/A |
| 3 | NM3 | M-03 | MT2 | SC-001 | VS-01 | VS-03 | N/A |
| 4 | NM4 | M-04 | MT2 | SC-001 | VS-01 | VS-04 | N/A |
| 5 | NM5 | M-05 | MT2 | SC-001 | VS-02<br>VS-03<br>VS-04 | VS-05 | N/A |
| 6 | NM6 | M-01 | MT1 | SC-002 | RS-01 | VS-06 | HPF (10kHz) |
| 7 | NM7 | M-03-ver.2 | MT2 | SC-002 | VS-06 | VS-07 | N/A |
| 8 | NM8 | M-04-ver.2 | MT2 | SC-002 | VS-06 | VS-08 | N/A |
| 9 | NM9 | M-08 | MT3 | SC-002 | M-01<br>M-02<br>VS-07<br>VS-08 | VS-09 | N/A |

ANALYSIS MODEL DB T3

FIG.7

| \\ | \\ | GROUPING POLICY DB T4 | \\ | \\ |
|---|---|---|---|---|
| C41 | C42 | C43 | C44 | C45 |
| PID | INDEX | VALUE | PRIORITY LEVEL | SELECTION POLICY |
| P-001 | RESOURCE SHARING RATE | 10% range | P1 | Min |
| P-002 | ACCURACY CHANGE RATE | 5% range | P2 | Min |
| P-003 | PROCESSING TIME CHANGE | 30S range | P3 | Min |
| ... | ... | ... | | |

FIG.8

| \multicolumn{5}{c}{DATA STORE MANAGEMENT DB T5} | | | | |
|---|---|---|---|---|
| CS1 | CS2 | CS3 | CS4 | CS5 |
| DID | NAME | TYPE | META-INFORMATION | FIELD |
| D-001 | MOTOR CURRENT | TIME SERIES | ACTUAL SENSOR Sampling: 1s | Timestamp, Asset ID, DTID, Current |
| D-002 | MOTOR CURRENT (LEVELING) | TIME SERIES | VIRTUAL SENSOR MID: M-01 | Timestamp, Asset ID, DTID, Current |
| D-003 | AXIS VOLTAGE | TIME SERIES | VIRTUAL SENSOR MID: M-02 | Timestamp, Asset ID, DTID, Voltage |
| D-004 | ROTATIONAL SPEED | TIME SERIES | VIRTUAL SENSOR MID: M-03 | Timestamp, Asset ID, DTID, Rotate |
| D-005 | TORQUE | TIME SERIES | VIRTUAL SENSOR MID: M-04 | Timestamp, Asset ID, DTID Torque |
| D-006 | REMAINING MOTOR LIFE | NORMAL | PREDICTION VALUE MID: M-05 | Asset ID, DTID ID, Remaining Life |
| D-007 | OPERATION LOG | NORMAL | MES | Timestamp, Asset ID, DTID, Operation |
| D-008 | REMAINING DRILL LIFE | NORMAL | PREDICTION VALUE MID: M-08 | Asset ID, DTID ID, Remaining Life |

FIG.9

| SCENARIO TEMPLATE DB T6 | | | |
|---|---|---|---|
| C61 | C62 | C63 | C64 |
| SID | NAME | TARGET APPARATUS MODEL | PREREQUISITE DATA |
| SC-001 | REMAINING MOTOR LIFE ESTIMATION SCENARIO | M001 | MOTOR CURRENT |
| SC-002 | REMAINING DRILL LIFE ESTIMATION SCENARIO | M001 | MOTOR CURRENT, OPERATION LOG |
| ... | ... | | |

FIG.10

| | SCENARIO APPLICATION PLAN DB T7 | | |
|---|---|---|---|
| | C71 C72 | C73 | C74 |
| Plan | EFFECT ON EXISTING CONFIGURATION | EFFECT SIMULATION | RESOURCE CONSUMPTION |
| Plan A | CHANGING SETTING OF PRE-PROCESS OF CURRENT SENSOR | ACCURACY OF ESTIMATING REMAINING MOTOR LIFE +-0 [%] PROCESSING TIME FOR ESTIMATING REMAINING MOTOR LIFE 10 [S] | CPU/Memory: 30%up Disk: 10GB/day |
| Plan B | CHANING SETTING OF PRE-PROCESS OF CURRENT SENSOR, CHANGING LOGIC FOR ESTIMATING ROTATIONAL SPEED, CHANGING LOGIC FOR ESTIMATING TORQUE | ACCURACY OF ESTIMATING REMAINING MOTOR LIFE -2 [%] PROCESSING TIME FOR ESTIMATING REMAINING MOTOR LIFE 60 [S] | CPU/Memory: 10%up Disk: 5GB/day |

FIG.11

| SCENARIO INSTANCE DB T8 | | | | |
|---|---|---|---|---|
| C81 | C82 | C83 | C84 | C85 |
| SCENARIO INSTANCE ID | APPLICATION DIGITAL TWIN | APPLICATION SCENARIO TEMPLATE | APPLICATION PLAN | APPLICATION SCENARIO |
| SCI-001 | DT-001 | SC-001 | - | SC-001 |
| SCI-002 | DT-002 | SC-001, SC-002 | Plan B | INTEGRATED SCENARIO B |
| ... | ... | | | |

FIG.18

IMPACT SIMULATION RESULT GP23

| Plan | EFFECT ON EXISTING CONFIGURATION | EFFECT SIMULATION | | RESOURCE CONSUMPTION | UPDATE TIME |
|---|---|---|---|---|---|
| | | | DETAIL | | |
| Plan A | CHANGING SETTING OF PREPROCESS OF CURRENT SENSOR CHANGING LOGIC FOR ESTIMATING ROTATIONAL SPEED CHANGING LOGIC FOR ESTIMATING TORQUE | REMAINING MOTOR LIFE ESTIMATION ESTIMATION ACCURACY -2 [%] REMAINING MOTOR LIFE ESTIMATION PROCESS TIME 60 [S] | | CPU/Memory: 10%up Disk: 5GB/day RESOURCE SHARING RATE 30% | 30min, REBOOT IS REQUIRED |
| Plan B | CHANGING SETTING OF PREPROCESS OF CURRENT SENSOR | REMAINING MOTOR LIFE ESTIMATION ESTIMATION ACCURACY +-0 [%] REMAINING MOTOR LIFE ESTIMATION PROCESS TIME 10 [S] | | CPU/Memory: 30%up Disk: 10GB/day RESOURCE SHARING RATE 5% | 0min, REBOOT IS NOT REQUIRED |

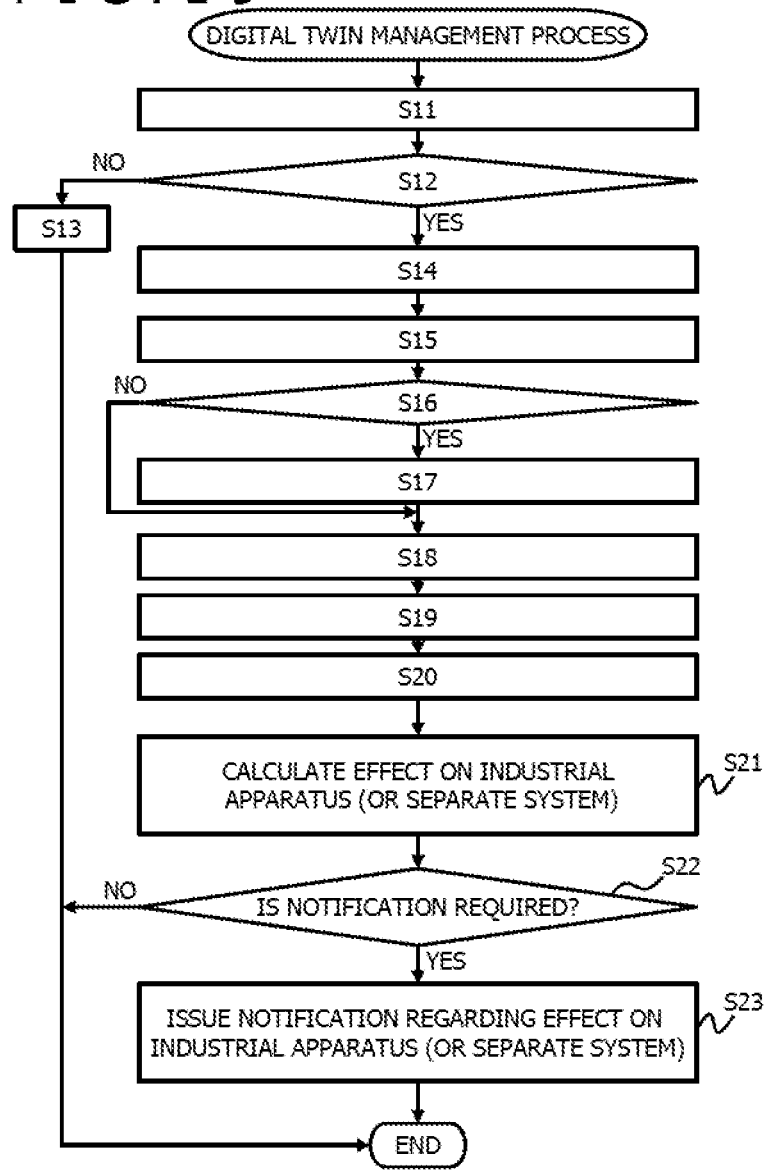

DIGITAL TWIN MANAGEMENT SYSTEM AND METHOD

BACKGROUND OF THE INVENTION

1. Field of the Invention

The present invention relates to a digital twin management system and a digital twin management method.

2. Description of the Related Art

A cyber physical system (CPS) that uses a digital twin in a cyber (digital) world to represent an apparatus, a process, a plant, or a system in the real world in order to understand, predict, or optimize a phenomenon has been studied. Through a digital twin, a behavior of a physical apparatus or the like can be predicted or verified by a simulation in a digital space or any other analysis method. In order to simplify the configuration of a digital twin, a method for implementing an efficient configuration according to a target apparatus or the like is proposed (U.S. Pat. No. 10,274,915 and US Patent Application Publication No. 2014/0019104).

Aside from a digital twin, a technology for, in a case where a plurality of patterns of processes that are different only in parameters from one another are given, executing the processes while omitting overlapping portions in order to enhance the efficiency of machine learning processes has been known (JP-2012-160014-A).

In a digital twin, when a simulation of a behavior of a physical apparatus or the like in a digital space or any other analysis method is used to predict performance or determine/verify a failure, an additional analysis method is applied or information regarding an additional sensor, etc., is added to, for example, the simulation model or the analysis model (hereinafter, referred to as a model) in some cases, so that addition or update of a model is conducted.

For example, in a digital twin environment (sensor, configuration/data management, model) for estimating the remaining life of a motor of a machining apparatus, an additional function for estimating the degree of abrasion of a drill which is a consumable item in the machining apparatus is added.

In this case, it takes time for a user who is a system manger or the like to determine whether or not the addition or update of the function is suited to the existing digital twin environment, and to recognize, in each site, a range to be changed or affected by the addition or update.

The conventional technologies disclose a method for dynamically configuring a new digital twin, but none of these technologies disclose a configuration method in which a possible effect on an existing digital twin environment is taken into consideration. Therefore, the user-friendliness is poor.

The present invention has been achieved in view of the abovementioned problems, and an object thereof is to provide a digital twin management system and a digital twin management method having improved user-friendliness.

SUMMARY OF THE INVENTION

In order to solve the above problems, a digital twin management system according to one aspect of the present invention for managing a digital twin that represents an actual physical system in a virtual space, the digital twin management system includes a processor and a memory that stores a predetermined computer program that is executed by the processor. In the digital twin management system, to generate an integrated scenario by adding a second scenario to a first scenario forming a digital twin, the processor extracts multiple parts that can be used in common in the first scenario and the second scenario, generates multiple integrated scenario candidates that are candidates of the integrated scenario, by changing the extracted parts that can be used in common, calculates an evaluation of each of the integrated scenario candidates, and outputs configuration information regarding each of the integrated scenario candidates and the evaluation of the integrated scenario candidate in association with each other.

According to the present invention, the configuration information and evaluation regarding each integrated scenario candidate formed by adding the second scenario to the first scenario forming the digital twin can be outputted, so that, in reference to the outputted configuration information and evaluation, a user can determine a possible effect by update of the digital twin. Accordingly, the user-friendliness is improved.

BRIEF DESCRIPTION OF THE DRAWINGS

FIG. 4 illustrates an example of an apparatus management database;

FIG. 5 illustrates an example of a digital twin configuration database;

FIG. 6 illustrates an example of an analysis model database;

FIG. 7 illustrates an example of a grouping policy database;

FIG. 8 illustrates an example of a data store management database;

FIG. 9 illustrates an example of a scenario template database;

FIG. 10 illustrates an example of a scenario application plan database;

FIG. 11 illustrates an example of a scenario instance database;

FIG. 18 is an example illustrating a part of the screen in FIG. 17 in detail; and FIG. 19 is a flowchart of a digital twin management process according to a second embodiment.

DESCRIPTION OF THE PREFERRED EMBODIMENTS

Hereinafter, embodiments of the present invention will be explained in reference to the drawings. A digital twin management system according to any one of these embodiments has, as scenario templates, configurations, data sets, data processing, behavior models, failure models, and process flows in a system for predicting or analyzing a remaining life or a failure.

The digital twin management system according to any one of the embodiments can be regarded as a system for managing a digital twin. A digital twin is a technology of collecting the operation status of an apparatus or device that is an actual physical system from a sensor, and creating a model in a virtual space in reference to the collected information. A digital twin created in a virtual space is linked with an actual system. For example, this technology can be used to calculate a remaining life, diagnose a failure, determine a trouble, and analyze performance.

In the digital twin management system according to any one of the embodiments, when a new scenario template is added to a digital twin environment being executed, to create an integrated scenario, the scenario template is compared with the configuration, data, data processing, a behavior model, a failure model, and an analysis flow in the existing environment. As a result, the digital twin management system creates multiple candidates the configuration of which can be partially used in common, calculates an impact (evaluation) to be exerted by each of the candidates, and presents the calculation result to a user.

Thus, according to any one of the embodiments, a user can objectively select a candidate that is determined as an optimum one, in reference to the information and the evaluations regarding the respective candidates, so that the user-friendliness is improved. Furthermore, according to any one of the embodiments, even a less-experienced user can properly manage a digital twin.

First Embodiment

Figure 1:
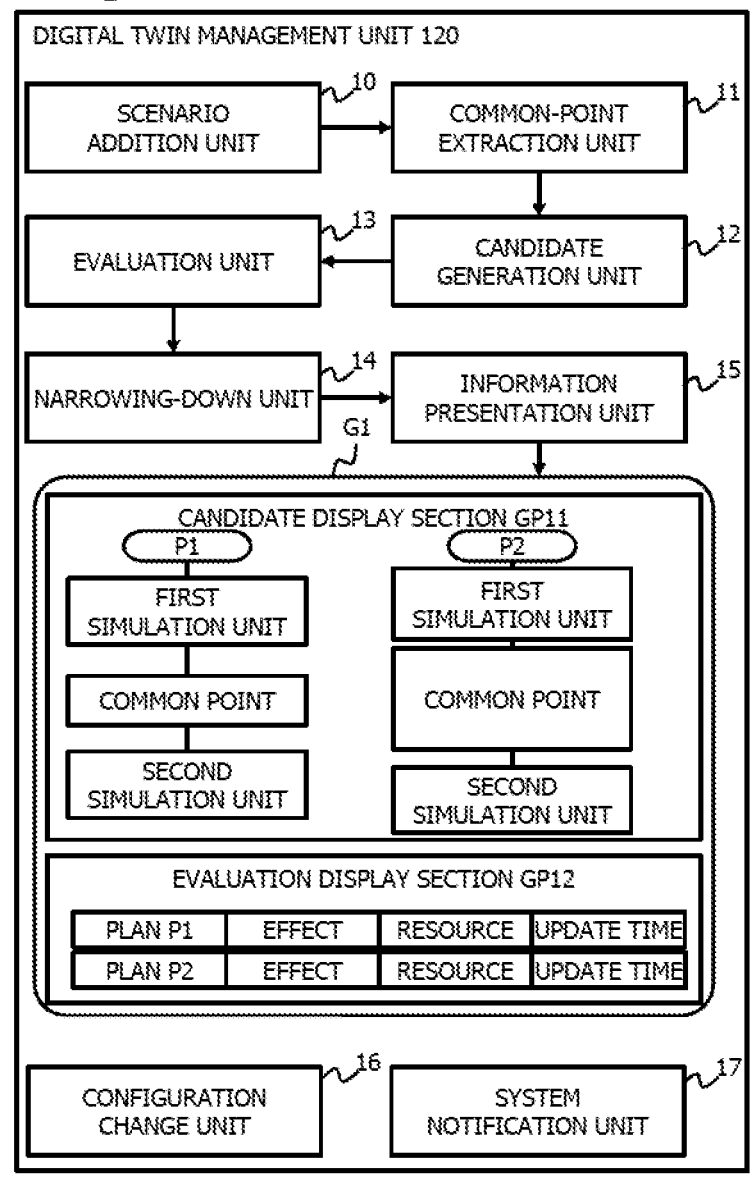
FIG. 1 is a schematic diagram of a digital twin management unit according to the present embodiment.

The first embodiment will be explained with reference to FIGS. 1 to 18. FIG. 1 is a schematic diagram of a digital twin management unit 120 which is one of elements constituting a digital twin management system 100.

The digital twin management unit 120 includes a scenario addition unit 10, a common-point extraction unit 11, a candidate generation unit 12, an evaluation unit 13, a narrowing-down unit 14, and an information presentation unit 15, for example. The digital twin management unit 120 may further include a configuration change unit 16. In addition, the digital twin management unit 120 may further include a system notification unit 17.

In the digital twin management unit 120, when the scenario addition unit 10 adds a new scenario to an existing scenario, the common-point extraction unit 11 compares a process flow of the existing scenario with a process flow of the new scenario, and extracts a part that can be used in common.

By changing a part that can be used in common, the candidate generation unit 12 generates multiple candidates of an integrated scenario (referred to as an integrated scenario or an updated scenario).

The evaluation unit 13 evaluates each of the integrated scenario candidates according to a predetermined evaluation index. Examples of the predetermined evaluation index include a usage rate of computer resources and performance stability; indexes which are related directly to the integrated scenario candidates, and are elements constituting a digital twin.

Besides these evaluation indexes or in place of these evaluation indexes, an index that has an effect on a separate system linked with an actual system (e.g., industrial apparatus) may be used. Examples of the separate system linked with an actual system include a production management system, a maintenance management system, and an inventory management system. Examples of the effect to be exerted on the separate system by update of a digital twin linked with an actual system include a change in the number of products that are produced by the actual system, a change in the inventory number of maintenance parts required for maintaining the actual system, and a change in a maintenance plan for the actual system.

The narrowing-down unit 14 selects, from among the multiple integrated scenario candidates generated by the candidate generation unit 12, one or more candidates to be presented to a user, in reference to the evaluations calculated by the evaluation unit 13. The narrowing-down unit 14 may group the integrated scenario candidates in accordance with a preset grouping policy, and select a candidate having the highest evaluation in a candidate group formed by the grouping. For example, the multiple integrated scenario candidates may be grouped in accordance with such a policy as a resource sharing rate, a change rate of a model accuracy, and the amount of change in a process time.

Figure 17:
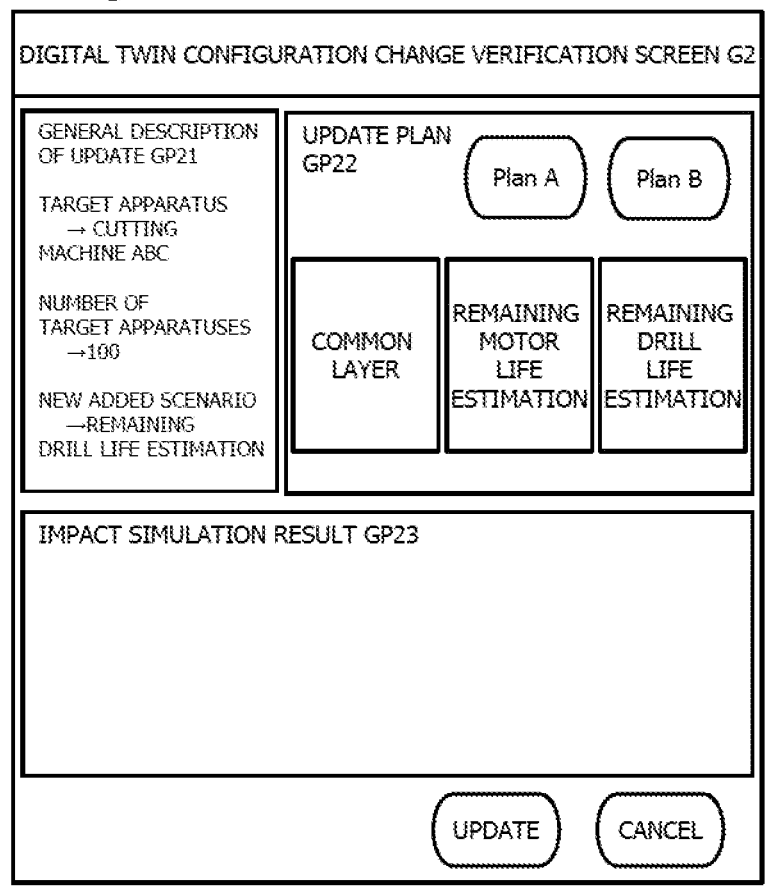
FIG. 17 is an example of a screen through which information regarding integrated scenario candidates is provided to a user.

The information presentation unit 15 presents the integrated scenario candidate selected by the narrowing-down unit 14 to the user through a screen G1 being displayed on a monitor display. The information presentation screen G1 includes a candidate display section GP11 and an evaluation display section GP12, for example. As illustrated in FIG. 17, which will be explained later, the screen G1 may include a region for displaying a general description of an update.

In the candidate display section GP11, a general description of one or more integrated scenario candidates is displayed. The general description includes a process flow of a first scenario, a process flow of a second scenario, and a common process flow (process flow of a common layer) which is used in both the first scenario and the second scenario, for example. Each process flow is not necessarily required to be displayed in detail as long as it is displayed to such an extent that the user can understand the general description. Further, a button for indicating the details may be disposed on the screen G1, so that the details of each process flow are displayed when the button is operated by the user. The first scenario refers to an addition destination scenario to which another scenario (second scenario) is to be added. The second scenario is a to-be-added scenario which is to be added to another scenario (first scenario). In the present embodiment, a case where one second scenario is added to one first scenario is explained. However, the present embodiment is not limited to this case, and is also applicable to a case where multiple second scenarios are added to one first scenario.

In the evaluation display section GP12, the evaluations based on a predetermined evaluation index are displayed for the respective integrated scenario candidates. For example, names for identifying the respective integrated scenario candidates and evaluation values (e.g., a possible effect on the performance, the resource sharing rate, a length of time required for update) are displayed in the evaluation display section GP12.

The configuration change unit 16 updates, when the user selects one of the integrated scenario candidates, an existing digital twin to the selected integrated scenario candidate.

The system notification unit 17 transmits a predetermined notification to an actual system (e.g., industrial apparatus) and/or a separate system linked with the actual system when the update to an integrated scenario candidate is conducted.

The predetermined notification is information indicating a possible effect on the actual system or information indicating a possible effect on the separate system linked with the actual system, for example.

Figure 2:
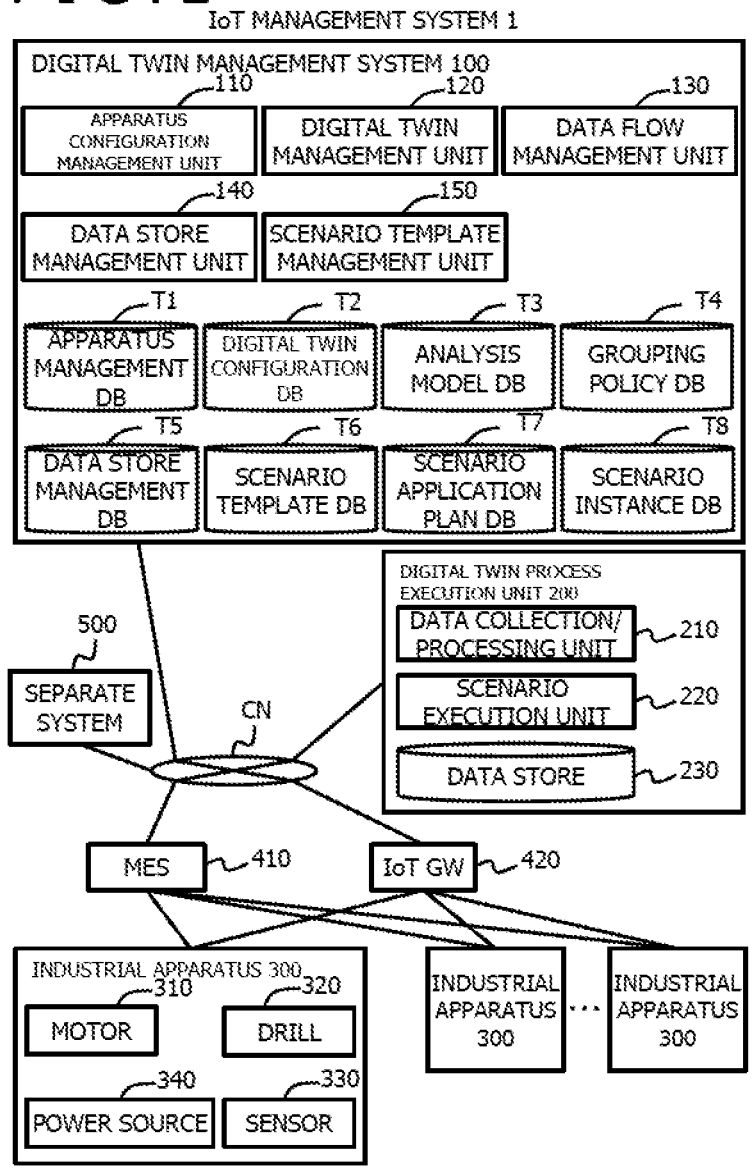
FIG. 2 is a configuration diagram of a digital twin management system and an Internet of Things (IoT) management system.

With reference to FIG. 2, the overall configuration of an IoT management system 1 according to the present embodiment will be explained. The IoT management system 1 includes the digital twin management system 100, a digital twin process execution unit 200, industrial apparatuses 300, a manufacturing execution system (MES) 410, and an IoT gateway 420, for example. The digital twin management system 100 and the digital twin process execution unit 200 can be formed of computers CS which will be explained later with reference to FIG. 3.

The digital twin management system 100 manages the industrial apparatuses 300 in a factory and the statuses of components included in the industrial apparatuses 300. The details of the digital twin management system 100 will be explained later.

The digital twin process execution unit 200 executes processing of a digital twin. The digital twin process execution unit 200 includes a data collection/processing unit 210, a scenario execution unit 220, and a data store 230, for example. Hereinafter, the data collection/processing unit 210 may be abbreviated as a data collection unit 210.

The data collection unit 210 obtains data from a sensor 330 of each industrial apparatus 300. The data obtained from the sensors 330 is stored in the data store 230. The scenario execution unit 220 executes a predetermined process of estimating a remaining life or detecting an abnormality, for example, in reference to the data obtained from the sensors 330 and a process flow.

In the abovementioned manner, the digital twin process execution unit 200 receives data from the industrial apparatuses 300 in the factory, analyzes the data, and outputs the analysis result. When the quantity and length of time of communication between the digital twin process execution unit 200 and the industrial apparatuses 300 are taken into consideration, it is preferable that the physical distance between the digital twin process execution unit 200 and each industrial apparatus 300 be as short as possible. As such, the digital twin process execution unit 200 of the present embodiment is installed in the factory where the industrial apparatuses 300 are disposed, or in a building that is close to the factory.

Placing the digital twin process execution unit 200 close to the industrial apparatuses 300 brings about the abovementioned advantage, but the present embodiment is not limited to this case. The digital twin process execution unit 200 may be placed at a physically great distance from each industrial apparatus 300. The digital twin process execution unit 200 may be placed in a computer in which the digital twin management system 100 is also included.

Each industrial apparatus 300 is one example of the "actual system," and is used in the factory. Examples of the industrial apparatuses 300 include cutting machines, pressing machines, rolling machines, injection molding machines, carrier devices, drying furnaces, heating furnaces, reaction furnaces, stirring devices, centrifugal machines, and packaging machines. In the present embodiment, cutting machines will be described as one example of the industrial apparatus 300.

It is to be noted that the actual systems are not limited to industrial apparatuses. For example, a man-machine conveyor device such as an elevator or escalator or such an apparatus as an automatic door or air blower that is used in an office, a commercial facility, or a public facility may be used as the actual system.

Each industrial apparatus 300 of the present embodiment includes a motor 310, a drill 320, the sensor 330, a power source 340, and an unillustrated controller, for example. Upon receiving power from the power source 340 serving as a "motive power source," the motor 310 serving as a "driving source" is rotated to rotate the drill 320 serving as a "consumable item." Accordingly, an object to be machined is cut, for example.

The sensor 330 detects the rotational speed of the motor 310, the current in the motor 310, the axial voltage in the motor 310, and the torque of the motor 310, for example, and outputs digital data. It is not necessary to use, as the sensor 330 included in each industrial apparatus 300, an actual sensor that actually measures a physical quantity of an object to be measured. At least one of the sensors 330 may be a virtual sensor that outputs data according to measurement data obtained by an actual sensor. When measurement data obtained by the actual sensor is inputted to a predetermined logic, output of the virtual sensor is obtained. The predetermined logic refers to a logic (analysis model) used for estimating a behavior of a target. Through the predetermined logic, the rotational speed or torque of the motor 310 is estimated according to an actual current value in the motor 310. The data obtained from the actual sensor and the data obtained from the virtual sensor are examples of the "data derived from the actual system."

The MES 410 is a production execution system. The MES 410 is connected to the industrial apparatuses 300 in a communicable manner. The MES 410 recognizes the respective statuses of the industrial apparatuses 300, and manages production steps. The MES 410 gives an instruction to a worker, and supports the work being conducted by the worker.

The IoT gateway 420 collects data from the sensors 330 of the respective industrial apparatuses 300, and transmits the data to the digital twin process execution unit 200.

The separate system 500 is related to the industrial apparatuses 300 which are actual systems. Examples of the separate system 500 include a design support system, a component management system, an inventory management system, a purchase system, a maintenance management system, and a worker management system.

The digital twin management system 100 is capable of providing data to the separate system 500, according to respective analysis results regarding the industrial apparatuses 300. For example, when there is a change in the remaining life of a certain industrial apparatus 300 or a component thereof, a maintenance plan needs to be changed, the number of components to be ordered needs to be adjusted, and an inventory needs to be adjusted. As such, the separate system 500 executes a necessary process in reference to information provided from the digital twin management system 100.

The digital twin management unit 120 manages a digital twin configuration DB T2, an analysis model DB T3, a grouping policy DB T4, a scenario application plan DB T7, and a scenario instance DB T8. The digital twin management unit 120 executes the process previously explained with reference to FIG. 1 and processes which will be explained later with reference to FIGS. 12 and 19. A data store management unit 140 manages, in the data store management DB T5, meta-information regarding data collected from the actual sensors and virtual sensors of the industrial apparatuses 300. A scenario template management unit 150 manages the scenario template DB T6. A user interface 160 for management implements a function of displaying a management screen.

Figure 3:
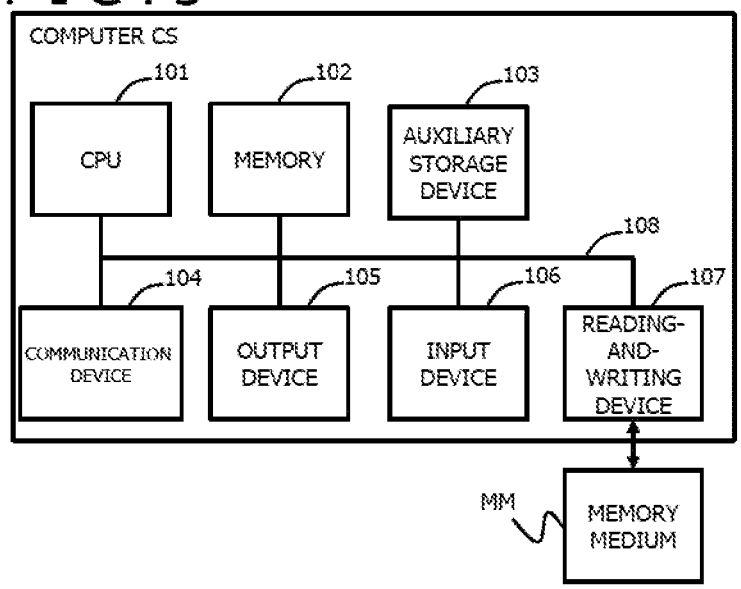
FIG. 3 is a hardware configuration diagram of a computer that is used in the digital twin management system.

FIG. 3 illustrates a hardware configuration example of a computer CS which can be used as the digital twin management system 100 or the digital twin process execution unit 200.

The computer CS includes a processor 101, a memory 102, an auxiliary storage device 103, a communication device 104, an output device 105, an input device 106, and a reading-and-writing device 107, for example. The devices 101 to 107 are connected via a bus 108.

The processor 101 reads a predetermined computer program transferred from the auxiliary storage device 103 to the memory 102, and executes the read program, whereby a predetermined function is implemented. In a case where the computer CS is used as the digital twin management system 100, the predetermined function is a function of the digital twin management system 100.

The communication device 104 communicates with other computers 200, 500, etc., over a communication network CN. The communication network CN may be a public line or may be a dedicated line.

The output device 105 provides information to a user of the digital twin management system 100 who is, for example, a system manager. For example, the output device 105 is a monitor display, a printer, or a speech synthesis device.

The input device 106 obtains an instruction or information from the user. For example, the input device 106 is a keyboard, a touch panel, a pointing device, or a speech recognition device.

The reading-and-writing device 107 writes/reads data into/from an external memory medium MM. For example, the external memory medium MM is such a medium as a flash memory, a hard disk, an optical disk, or a magnetic tape, in which stored data can be held for a long period of time.

A computer program or data stored in the external memory medium MM can be transferred from the reading-and-writing device 107 to the memory 102 or the auxiliary storage device 103. Further, a computer program or data stored in the memory 102 or the auxiliary storage device 103 can be transferred to the external memory medium MM. A portion or the whole of a predetermined computer program for implementing each function in the digital twin management system 100 of the present embodiment may be stored in the external memory medium MM, and the external memory medium MM may be sold on the market.

Alternatively, a predetermined computer program regarding the digital twin management system 100 may be transferred to a separate computer or a separate storage device (which are not illustrated) over the communication network CN without using any external memory medium MM. In addition, the digital twin management system 100 may receive a computer program or data from an external program distribution server (not illustrated), and may store the computer program or data in the auxiliary storage device 103.

The output device 105 and the input device 106, which are included in the computer CS and are used for information exchange with a user, may be disposed in an operation terminal (not illustrated) that is separate from the computer CS. For example, a desktop type personal computer, a laptop type personal computer, a tablet terminal, a cellular phone (or what is generally called a smartphone), a mobile information terminal, or a wearable terminal may be used as the operation terminal.

FIG. 4 illustrates an example of the apparatus management database T1. In the apparatus management database T1, information regarding apparatuses (the industrial apparatuses 300) that are being managed by the digital twin management system 100 is managed.

The apparatus management database T1 includes an asset ID C11, an apparatus name C12, a model C13, configuration information C14, an installation site C15, and an installation date C16, for example.

The asset ID C11 is identification information for uniquely identifying each industrial apparatus 300 that is being managed by the digital twin management system 100. The apparatus name C12 is a name of the corresponding industrial apparatus 300, and is information indicating the apparatus type which is a "cutting machine 001," a "pressing machine 007," or an "injection molding machine 333," for example.

The model C13 indicates information for identifying models of the industrial apparatuses 300 of the same type. Some of the industrial apparatuses 300 of the same type have slightly different specifications, and thus, different model names are given therefor.

The configuration information C14 is information indicating the configuration of the corresponding industrial apparatus 300. For example, the information indicating the configuration of the corresponding industrial apparatus 300 refers to the number of main components constituting the corresponding industrial apparatus 300 and the model type of each of the main components. A list of main components constituting each industrial apparatus 300 may be prepared, and information for identifying the list may be stored in the field of the configuration information C14.

The installation site C15 is information for identifying the site where the corresponding industrial apparatus 300 is installed. The installation site C15 may be specified by a building number and a line number, for example. Values indicating coordinates in the site of the factory may be stored in the installation site C15. The installation date C16 indicates the date of installation the corresponding industrial apparatus 300 into the factory.

FIG. 5 illustrates an example of the digital twin configuration database T2. In the digital twin configuration database T2, the configuration of a digital twin that represents an industrial apparatus 300 in a virtual space is managed.

The digital twin configuration database T2 includes a digital twin ID (abbreviated as DTID in the drawings) C21, a name C22, a target apparatus ID C23, meta-information C24, monitoring information C25, a configured scenario instance C26, and digital twin relationship information C27, for example.

The digital twin ID (DTID in the drawing) C21 indicates identification information for identifying a digital twin. The name C22 is the name of the digital twin. The name of the digital twin may include at least a portion of the name of an industrial apparatus corresponding to the digital twin.

The target apparatus ID C23 indicates identification information for identifying an industrial apparatus 300 corresponding to the digital twin. For the target apparatus ID C23, a value identical to that of the asset ID C11 in the apparatus management database T1 is used.

The meta-information C24 is meta-information regarding the digital twin. Examples of the meta-information include a model name, a serial number (S/N), and an installation date.

The monitoring information C25 is sensor data, regarding the associated industrial apparatus 300, being monitored by the digital twin. In order to be linked with information being managed in the data store management DB T5, DID C51 is stored in the monitoring information C25.

The sensor data is data obtained from a real sensor 330 (actual sensor 330) or data obtained from a virtual sensor. The data from a virtual sensor is obtained when the data obtained from the actual sensor 330 is inputted to a predetermined logic (analysis model).

The configured scenario instance C26 indicates an instance of a configured scenario. According to the scenario, the remaining life of a motor 310 is estimated from a motor current, a motor axis voltage, and a motor rotational speed, for example. Any other type of a scenario may be prepared.

The digital twin relationship information C27 indicates information regarding the relationship with another digital twin. For example, for a cutting apparatus digital twin 001 (DTID: DT-001) which is a digital twin of a cutting apparatus 001, the relationship with an industrial motor digital twin 001 (DTID: DT-003) of an inner industrial motor A which is one of components constituting the cutting apparatus 001 is indicated as "Child," and this information is stored in the digital twin relationship information C27. In addition, a relationship "Parent" with the cutting apparatus digital twin 001 (DTID: DT-001) which is a digital twin of the cutting apparatus 001 is stored in the digital twin relationship information C27 of the industrial motor digital twin 001.

FIG. 6 illustrates an example of the analysis model database T3. In the analysis model database T3, an analysis model and the relation between the analysis model and a scenario are managed.

The analysis model database T3 includes a serial number C31, a name C32, a model ID C33, a type C34, a scenario ID C35, an input parameter C36, an output parameter C37, and a setting parameter C38, for example.

The serial number C31 indicates a serial number that is assigned to each record. The name C32 indicates an analysis model name. Each analysis model name may be given to make the role (purpose), which is not indicated in FIG. 6, of the corresponding analysis model recognizable by a user. The analysis model name is current leveling (NM1), axis voltage estimation (NM2), torque estimation (NM3), rotational speed estimation (NM4), remaining motor bearing life estimation (NM5), current leveling (NM6), torque estimation (NM7), rotational speed estimation (NM8), or cutting machine drill failure diagnosis (NM9), for example.

The model ID (MID in the drawings) C33 is identification information for uniquely identifying an analysis program constituting the corresponding analysis model. Here, in FIG. 6, M-03 is an identifier of a torque estimation program, and M-03-ver.2 is an identifier of an updated torque estimation program which is a different version of M-03 obtained by improving M-03 in terms of the estimation accuracy, for example. Similarly, in FIG. 6, M-04 is an identifier of a rotational speed estimation program, and M-04-ver.2 is an identifier of an updated rotational speed estimation program which is a different version of M-04 obtained by improving M-04. The type C34 indicates the type of the corresponding analysis model. The analysis model type is pre-process (MT1), behavior estimation (MT2), or failure determination (MT3), for example.

The scenario ID C35 indicates information for identifying a scenario in which the corresponding analysis model is used. The input parameter C36 indicates a parameter that is inputted to the corresponding analysis model. The input parameter is actual motor current (RS-01), motor current (after application of a high-pass filter) (VS-01), axis voltage (VS-02), torque (VS-03), rotational speed (VS-04), motor current (after application of a high-pass filter) (VS-06), material quality (M-01), usage history (M-02), torque (VS-07), or rotational speed (VS-08), for example.

The output parameter C37 indicates a parameter that is outputted from the corresponding analysis model. The output parameter is motor current (after application of a high-pass filter) (VS-01), axis voltage (VS-02), torque (VS-03), rotational speed (VS-04), remaining life (VS-05), motor current (after application of a high-pass filter) (VS-06), torque (VS-07), rotational speed (VS-08), or drill abrasion state (VS-09), for example.

The setting parameter C38 indicates a parameter that is set for the corresponding analysis model. The setting parameter C38 is a high-pass filter (HPF), for example.

FIG. 7 illustrates an example of the grouping policy database T4. A grouping policy refers to a standard for grouping integrated scenario candidates.

The grouping policy database T4 includes a policy ID (PID in the drawing) C41, an index C42, a value C43, a priority level C44, and a selection policy C45, for example.

The policy ID C41 is information for identifying a grouping policy. The index C42 indicates the content of the corresponding grouping policy. Examples of the index include a resource sharing rate, an accuracy change rate, and a change of a processing time period. The value C43 indicates the range of values used for grouping multiple integrated scenario candidates according to the index C42. The priority level C44 indicates the priority level of the corresponding grouping policy. The selection policy C45 indicates a criterion used to select an integrated scenario.

FIG. 8 illustrates an example of the data store management database T5. In the data store management database T5, data that is used in the digital twin management system 100 is managed. The data store management database T5 includes a data store ID C51, a name C52, a type C53, meta-information C54, and a field C55, for example.

The data store ID (DID in the drawings) C51 indicates information for identifying data being managed. The name C52 is the name of the data being managed. The type C53 indicates the type of the data, that is, indicates whether the data is time-series data or other types of data. The meta-information C54 indicates attribute information regarding the data being managed. The meta-information is information regarding from what the corresponding data is derived (whether the data is obtained from an actual sensor or a virtual sensor) and a collection interval of the data (if the data is derived from an actual sensor).

The field C55 indicates items included in the data being managed. In the data field, for example, data acquisition date and time (time stamp), identification information (asset ID) regarding an industrial apparatus corresponding to the data, identification information (DTID) of a digital twin corresponding to the industrial apparatus, and data values (current value, voltage value, torque, operation) are stored.

FIG. 9 illustrates an example of the scenario template database T6. In the scenario template database T6, templates of scenarios are managed. In the present embodiment, a predetermined information group that is required to add a model (simulation function) to a digital twin is templated as a scenario. The scenario template database T6 includes a scenario ID (SID in the drawings) C61, a name C62, a target apparatus model C63, and prerequisite data C64, for example.

The scenario ID C61 indicates information for identifying a scenario template. The name C62 is the name of the corresponding scenario template. For example, a "remaining motor life estimation scenario" or a "remaining drill life estimation scenario" from which the role of the corresponding template can be recognized can be used as the name. In the target apparatus model C63, an identifier for identifying an apparatus model to which the corresponding scenario is applicable is stored. The prerequisite data C64 indicates a prerequisite for using the corresponding scenario template. For example, in order to use the remaining motor life estimation scenario, a motor current is required. In order to use the remaining drill life estimation scenario, a motor current and an operation log are required.

FIG. 10 illustrates an example of the scenario application plan database T7. In the scenario application plan database T7, the content of a candidate (integrated scenario candidate) that is used when a new simulation function is added to an existing digital twin is indicated. Hereinafter, two candidates are described, but three or more candidates may be created.

The scenario application plan database T7 includes a plan name (Plan in FIG. 10) C71, an effect on existing configuration C72, an effect simulation C73, and resource consumption C74, for example.

The plan name C71 is a name of a plan of a case where a new scenario is applied to an existing digital twin. A digital twin obtained by adding a function defined by a new scenario to an existing digital twin may be called an update digital twin. An update digital twin is formed by integrating multiple scenarios.

The effect on existing configuration C72 indicates an effect which is exerted on the configuration of an existing digital twin. In the effect on existing configuration C72, information indicating which part in the configuration of an existing digital twin is changed is recorded. For example, the information is "changing setting of a pre-process of a current sensor," "changing a logic for estimating a rotational speed," or "changing a logic for estimating a torque," for example.

The effect simulation C73 indicates a simulation result of an effect to be exerted on the performance of an update digital twin when a new scenario is applied to an existing digital twin. In the digital twin management system 100, candidates of an update digital twin are simulated with use of data collected in the past, whereby an effect to be exerted on the performance of the update digital twin is calculated. In the effect simulation C73, such predictions that "the accuracy of estimating a remaining motor life is lowered by 2%" and "a process time for estimating a remaining motor life is 60 seconds" are stored.

The resource consumption C74 indicates resources which are consumed by the corresponding update digital twin. The resources are computer resources including a processor use rate, memory consumption, and the use rate in the auxiliary storage device, for example.

Figure 15:
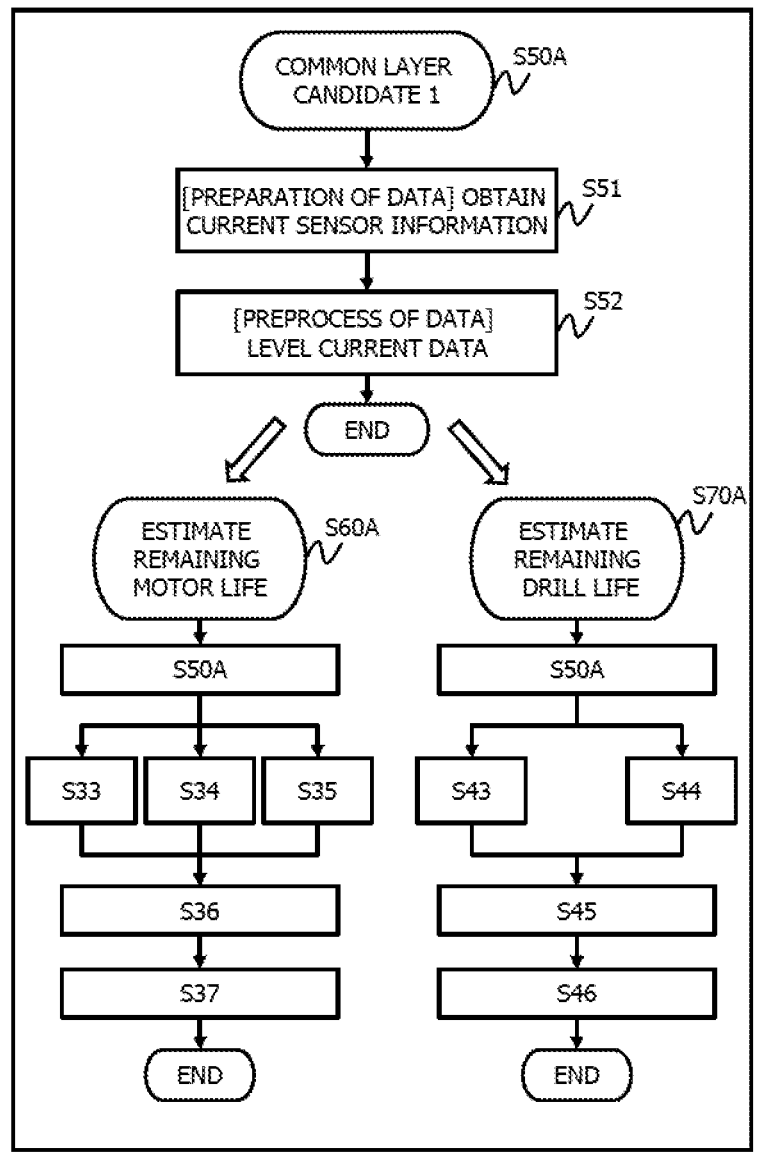
FIG. 15 is an explanatory diagram illustrating one example of an integrated scenario candidate (updated digital twin candidate)
Figure 16:
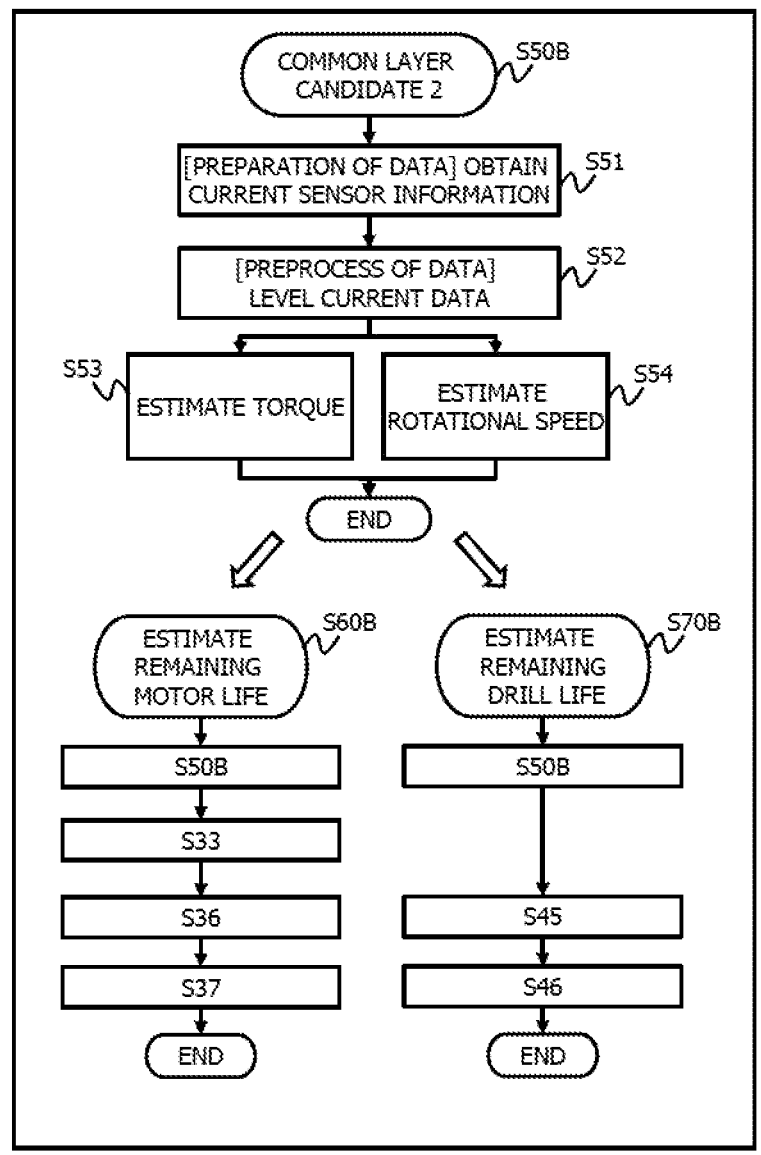
FIG. 16 is an explanatory diagram illustrating another example of the integrated scenario candidate.

FIG. 11 illustrates an example of the scenario instance database T8. The scenario instance database T8 includes a scenario instance ID C81, an application digital twin C82, an application scenario template C83, an application plan C84, and an application scenario C85, for example. The scenario instance ID C81 indicates information for identifying each scenario instance. The application digital twin C82 indicates identification information (ID) regarding a digital twin to be applied. The application scenario template C83 indicates a scenario template to be applied. The application plan C84 indicates a plan (candidate of an update digital twin) to be applied. The application scenario C85 indicates a scenario to be applied. In the application scenario C85, identification information (ID) about a generated integrated scenario illustrated in FIG. 15 or 16 is stored. FIG. 11 illustrates an example in which an integrated scenario B is selected.

A user selects, as "application," one of plans that are proposed on the screen to the user. As a result, a digital twin (C82), a scenario template on which the digital twin is based (C83), a plan applied to the digital twin (C84), and a final process flow (C85) therefor are associated with one another and managed in the scenario instance database T8.

Figure 12:
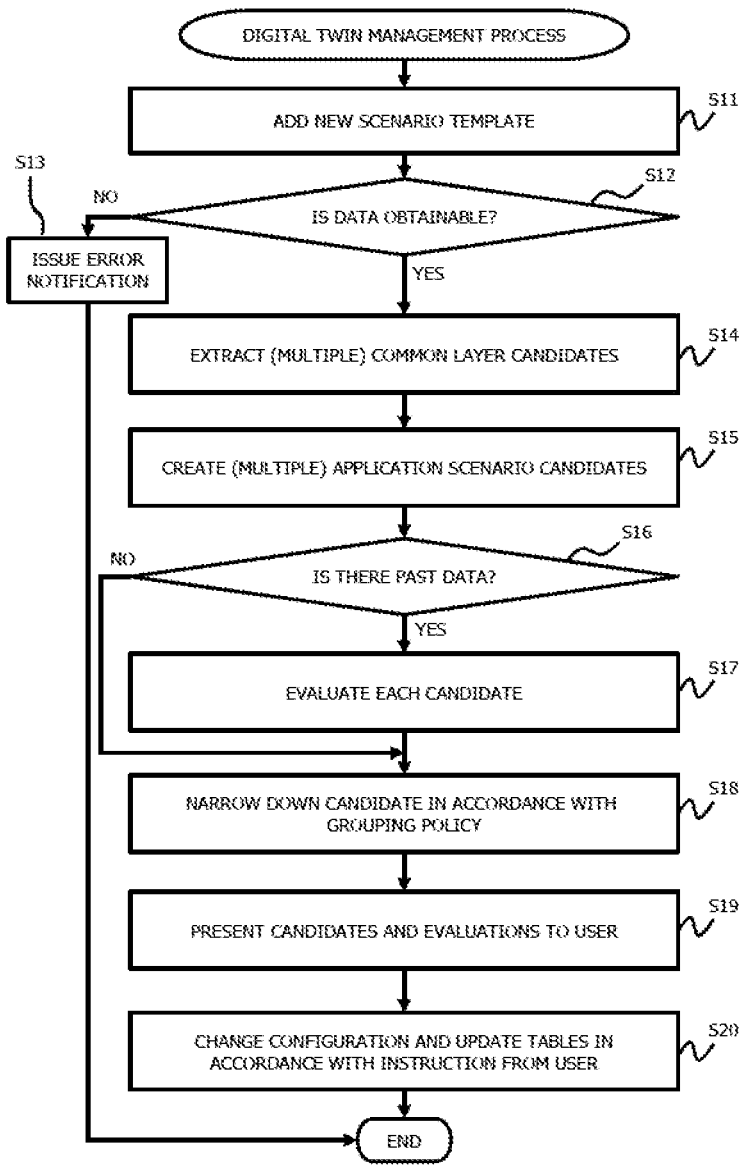
FIG. 12 is a flowchart of a digital twin management process.

With reference to a flowchart in FIG. 12, a digital twin management process will be explained. When an instruction to add a new scenario template to an existing digital twin is received (S11), the digital twin management system 100 determines whether or not data necessary for the new scenario template is obtainable from an industrial apparatus 300 that is a target of the digital twin (S12). Either data obtained from an actual sensor or data obtained from a virtual sensor can be used as the necessary data.

When determining that the necessary data is not obtainable (S12: NO), the digital twin management system 100 issues an error notification to a user (e.g., system manager) who is using the digital twin management system 100 (S13).

When determining that the necessary data is obtainable (S12: YES), the digital twin management system 100 compares the configuration of the existing digital twin with the configuration of the new scenario template, and extracts multiple common layer candidates which are common to the existing digital twin and the new scenario template (S14).

The digital twin management system 100 creates multiple candidates of an update digital twin from the multiple common layer candidates (S15). The digital twin management system 100 checks whether there is any past data that can be used to evaluate each of the update digital twin candidates (S16).

When determining that there is past data that can be used (S16: YES), the digital twin management system 100 executes each of the update digital twin candidates (application scenarios) by using the past data, makes respective evaluations by comparison of the obtained result values with a past result value (S17), organizes the evaluation results in accordance with the grouping policy, and narrows down the update digital twin candidates in order of high evaluation (S18).

When determining that there is no past data that can be used to evaluate the update digital twin candidates (S16: NO), the digital twin management system 100 proceeds to step S18 by skipping the evaluation step (S17).

By displaying, on the monitor display, the description of the update digital twin candidates and the evaluations thereof, the digital twin management system 100 presents the information to the user (S19). The user selects any one of the update digital twin candidates by using the presented information, and informs the digital twin management system 100 of the selected update digital twin candidate. The digital twin management system 100 changes the configuration of the digital twin in such a manner as to achieve the update digital twin selected by the user (S20). Further, tables related to the digital twin are updated in line with the configuration change. Specifically, the digital twin (C82), a scenario template on which the digital twin is based (C83), a plan applied to the digital twin (C84), and an application scenario as a final process flow (C85) therefor are associated with one another and managed in the scenario instance database T8. In addition, the configured scenario instance C26 in the digital twin configuration DB T2 is updated to the added or updated scenario instance ID C81. Moreover, the identifier (DID C51) in the data store management DB T5 regarding information concerning a storage destination of data that is calculated by application of analysis models that are written in the analysis model DB T3 for implementing processes of the applied scenario is stored in the monitoring information C25 in the digital twin configuration DB T2.

Figure 13:
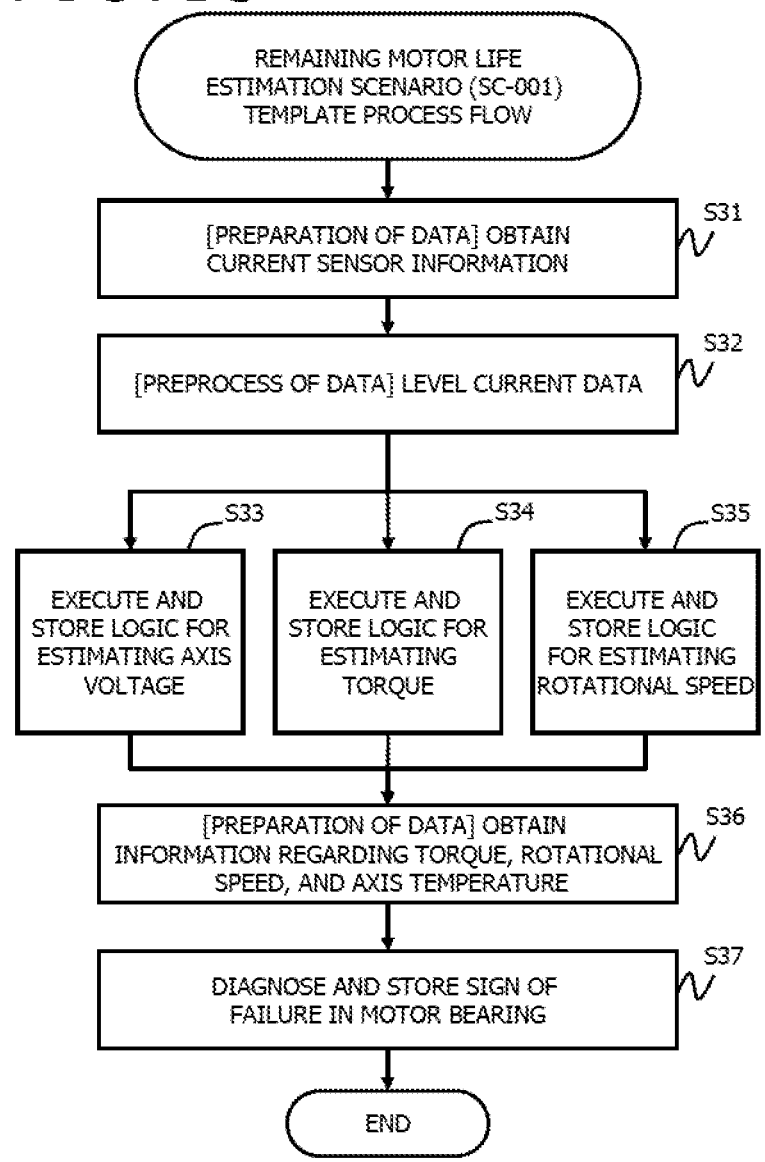
FIG. 13 is a template process flow which is included in a remaining motor life estimation scenario.
Figure 14:
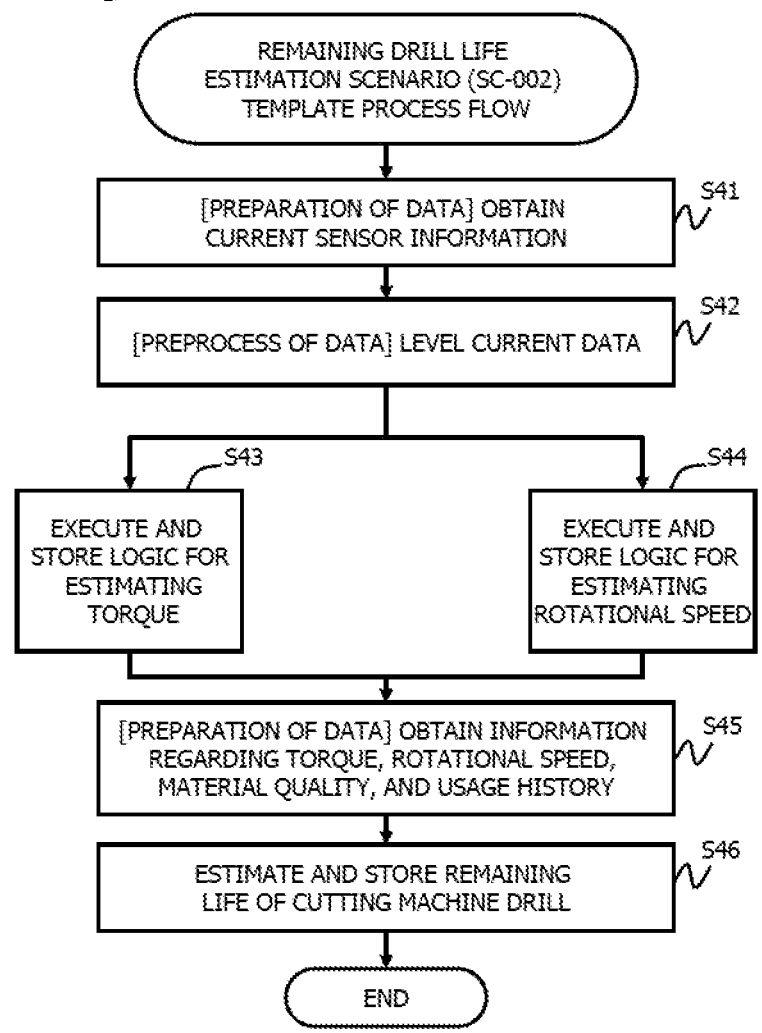
FIG. 14 is a templated process flow which is included in a remaining drill life estimation scenario.

With reference to FIGS. 13 to 16, creation of candidates of an update digital twin will be explained. FIG. 13 illustrates a templated process flow that is included in a scenario for estimating the remaining life of a motor 310. FIG. 14 is a templated process flow that is included in a scenario for estimating the remaining life of a drill 320.

It is assumed that an existing digital twin is configured to estimate the remaining life of a motor 310 in accordance with the process flow illustrated in FIG. 13. An example of creating a new integrated digital twin candidate by adding a scenario for estimating the remaining life of a drill 320 illustrated in FIG. 14 to the existing digital twin will be explained.

In a process flow of the remaining motor life estimation scenario which is illustrated in FIG. 13, data (RS-01) obtained from a current sensor is first prepared (S31). An analysis model (NM1) is applied to the prepared sensor data (RS-01) to level the sensor data, so that pre-processed data (VS-01) is generated (S32). The pre-processed data (VS-01) is inputted to each of analysis models (logics) (S33 to S35). The analysis models include a logic (NM2, S33) of estimating and storing an axis voltage, a logic (NM3, S34) for estimating and storing a torque, and a logic (NM4, S35) for estimating and storing a rotational speed.

Next, in the process flow, data sets (the torque (VS-02), the rotational speed (VS-03), the axis voltage (VS-04)) to be inputted to a final analysis model are prepared (S36). The prepared data sets are inputted to an analysis model (NM5) for diagnosing a sign of a motor bearing failure (S37). A sign of a bearing failure in the motor 310 is diagnosed by the analysis model, the remaining life (VS-05) of the motor 310 is estimated from the failure sign, and the result obtained by the analysis model is stored in the data store (D-006) (S37).

In a process flow of the remaining drill life estimation scenario which is illustrated in FIG. 14, data (RS-01) obtained from a current sensor is prepared (S41). An analysis model (NM6) is applied to the prepared sensor data (RS-01) to level the sensor data, so that pre-processed data (VS-06) is generated (S42). The pre-processed data (VS-06) is inputted to each of analysis models (logics) (S43, S44). The analysis models include a logic (NM7, S43) for estimating and storing a torque and a logic (NM8, S44) for estimating and storing a rotational speed.

Next, in the process flow, data sets (the torque (VS-07), the rotational speed (VS-08), the material quality (M-01), and the usage history (M-02)) to be inputted to a final analysis model are prepared (S45). The material quality and the usage history refer to the material quality of the drill 320 and the usage history of the drill 320, respectively.

The prepared data sets are inputted to an analysis model (NM9) for estimating the remaining drill life (S46), and the result obtained by the analysis model is stored in a data store (D-008).

An example of a candidate of an update digital twin in a case where the remaining drill life estimation scenario which has been explained with reference to FIG. 14 is added to the digital twin for estimating a remaining motor life which has been explained with reference to FIG. 13 will be explained.

FIG. 15 illustrates one example (Plan A, integrated scenario A) of an update digital twin candidate. FIG. 15 illustrates a process flow S50A of a common layer candidate 1, a process flow S60A for estimating a remaining motor life in which the process flow S50A of the common layer candidate 1 is adopted, and a process flow S70A for estimating a remaining drill life in which the process flow S50A of the common layer candidate 1 is similarly adopted.

In this candidate example, steps S31 and S41 of preparing data from a current sensor and steps S32 and S42 of pre-processing the data obtained from the current sensor are used in common as step S51 of preparing data from a current sensor and step S52 of pre-processing the data obtained from the current sensor, respectively.

FIG. 16 illustrates another example of an update digital twin candidate (Plan B, integrated scenario B). FIG. 16 illustrates a process flow S50B of a common layer candidate 2, a process flow S60B for estimating a remaining motor life in which the process flow S50B of the common layer candidate 2 is adopted, and a process flow S70B for estimating a remaining drill life in which the process flow S50B of the common layer candidate 2 is similarly adopted.

In this candidate example, not only step S51 of preparing data from a current sensor and step S52 of pre-processing the data from the current sensor but also step S53 of estimating a motor torque by an analysis model and step S54 of estimating a motor rotational speed by an analysis model are used in common. Step S53 corresponds to step S34 and step S43. Step S54 corresponds to step S35 and step S44. The version of a torque estimation analysis program which is used by the torque estimation analysis model NM3 in step S34 is different from that of a torque estimation analysis program which is used by the torque estimation analysis model NM7 in step S43. Thus, to use in common torque estimation steps in step S53, which one of the programs is to be used needs to be decided. As one decision method therefor, a method of deciding to use a program of a newer version is adopted in the present embodiment. However, the method is not limited to this.

Since the part to be used in common in the candidate example (Plan B, integrated scenario B) illustrated in FIG. 16 is larger than that in the candidate example (Plan A, integrated scenario A) illustrated in FIG. 15, the sharing rate of computer resources in the Plan B is high and the resource consumption C74 in the Plan B is low, as illustrated in FIG. 10, for example. However, since the part used in common in the candidate example (Plan B, integrated scenario B) illustrated in FIG. 16 is larger than that in the candidate example (Plan A, integrated scenario A) illustrated in FIG. 15, the effect on the existing configuration C72 of the Plan B is greater (more items are written in the effect on the existing configuration C72). Consequently, in many steps, an analysis model that is different from an analysis model having been used so far is applied, for example, so that there is a possibility that the estimation accuracy and the length of estimation process time in the analysis are affected. Regarding an effect caused by such a change, integrated scenarios (integrated scenario A, integrated scenario B) are implemented with use of the past data in step S17, a remaining motor life estimation value and a length of process time therefor are calculated, and the calculated values are compared with a result obtained by a previously applied scenario, and stored in the effect simulation C73. Through the effect simulation C73, a manager is able to check the degree of the effect.

FIG. 17 illustrates an example of a screen G2 on which candidates of an update digital twin are presented to a user. The screen G2 is one detailed example of the screen G1 illustrated in FIG. 1. On the screen G2, a result of a verification of a digital twin configuration change when an existing digital twin is expanded to a new scenario is provided to a user.

The screen G2 includes a general description of update GP21, an update plan GP22, an impact simulation result GP23, an update button, and a cancel button, for example.

The general description of update GP21 indicates a general description of an update of a digital twin. The general description of an update includes information for identifying an industrial apparatus 300 corresponding to a digital twin, the number of identified industrial apparatuses 300, and information for designating a new scenario to be added to an existing digital twin, for example.

The update plan GP22 includes information regarding the configuration of a candidate plan (plan). The information regarding a candidate plan includes information regarding a common layer part, information regarding a part for estimating a remaining motor life, and a part for estimating a remaining drill life, for example. In the update plan GP22, buttons or tabs for displaying the names, i.e., "Plan A" and "Plan B," of the candidate plans may be provided in such a way that a user can select any one of the buttons or tabs. In the update plan GP22, the content of a candidate plan selected by a user is displayed.

In the impact simulation result GP23, a result obtained by evaluating any one of the candidates with use of a predetermined evaluation index is displayed.

FIG. 18 illustrates one example of the impact simulation result GP23. The impact simulation result GP23 includes a candidate name GP231, an effect on existing configuration of digital twin (configuration of process flow) GP232, an effect simulation GP233, computer resource consumption GP234, and an update time GP235, for example.

In the effect on existing configuration of digital twin GP232, a setting change in a pre-process of sensor data and a change of an analysis model are displayed, for example. In the effect simulation GP233, a simulation result regarding a performance change when a digital twin is updated in accordance with a selected plan is displayed. A process of the effect simulation is performed using past data. The effect simulation indicates a percentage by which the remaining motor life estimating accuracy is increased (or reduced), and a change in a length of time required for estimating a remaining motor life, for example.

The computer resource consumption GP234 indicates consumption of various types of resources such as a processor usage rate, memory consumption, consumption in the auxiliary storage device, for example. In addition, the sharing rate of computer resources is also indicated in the computer resource consumption.

The update time GP235 indicates a length of time required for updating a digital twin in accordance with a selected plan, and whether reboot is required or not.

According to the present embodiment configured as described above, in a case where a new scenario is added to a digital twin that is being executed, information regarding candidates of an update digital twin can be provided to a user. Consequently, the user-friendliness is improved.

According to the present embodiment, multiple candidates the configurations of which are partially used in common and a result of a simulation in which each of the candidates is selected can be provided to a user. Consequently, the user can objectively and efficiently determine which candidate is preferable.

Second Embodiment

The second embodiment will be explained with reference to FIG. 19. In the present embodiment, the difference from the first embodiment will mainly be explained. FIG. 19 is a flowchart of a digital twin management process.

To update a digital twin by adding a new scenario thereto (S11 to S20), the digital twin management system 100 of the present embodiment calculates a possible effect on a separate system 500 or an industrial apparatus 300 corresponding to the digital twin (S21).

In reference to the result of the calculation in step S21, the digital twin management system 100 determines whether issuance of a notification to the industrial apparatus 300 or the separate system 500 is needed (S22). When it is determined that such a notification is not needed (S22: NO), the present process is ended.

When determining that a notification to the industrial apparatus 300 or the separate system 500 is needed (S22: YES), the digital twin management system 100 issues a notification indicating that the digital twin has been updated, to the industrial apparatus 300 or the separate system 500 (S23).

The abovementioned present embodiment also provides the same effect as those of the first embodiment. According to the present embodiment, further, a digital twin is updated, so that, if the accuracy of estimating the remaining lives of main components of industrial apparatuses 300 is degraded, for example, the inventories of the main components can be increased, or a timing for ordering the main components can be set earlier. Consequently, the user-friendliness is further improved.

It is to be noted that the present invention is not limited to the abovementioned embodiments, and encompasses a variety of modifications. For example, since the abovementioned embodiments have been provided to explain the present invention in detail in an easy-to-understand manner, the present invention is not necessarily limited to an embodiment including all the components explained herein. Moreover, a part of one of the embodiments can be replaced with a part of the other embodiment. Further, a part of one of the embodiments can be added to the other embodiment. In addition, a part of the embodiments can be omitted, be replaced with another part, or be added to another part.

For example, the performance of a main component such as a control substrate or a power source circuit in an industrial apparatus can be evaluated, and the remaining life thereof can be estimated.

What is claimed is:

1. A digital twin management system for managing a digital twin that represents an actual physical system in a virtual space, the digital twin management system comprising:
   a processor; and
   a memory that stores a predetermined computer program that is executed by the processor, wherein,
   to generate an integrated scenario by adding a second scenario to a first scenario, the processor
      extracts multiple parts that can be used in common in the first scenario and the second scenario,
      generates multiple integrated scenario candidates that are candidates of the integrated scenario, by changing the extracted parts that can be used in common,
      calculates an evaluation of each of the generated integrated scenario candidates, and
      outputs configuration information regarding each of the integrated scenario candidates and the evaluation of the integrated scenario candidate in association with each other.

2. The digital twin management system according to claim 1, wherein each of the first scenario, the second scenario, and the integrated scenario is formed by templating, as a scenario, a digital twin configuration that includes information indicating a configuration of a target actual system, attribute information indicating a purpose of the scenario, data derived from the actual system, a process flow that is executed in reference to the obtained data, an analysis model included in the process flow, and an input/output parameter of the analysis model.

3. The digital twin management system according to claim 2, wherein,
by comparison of the first scenario with the second scenario, multiple parts that can be used in common by the first scenario and the second scenario are extracted.

4. The digital twin management system according to claim 1, wherein
configuration information regarding each of the integrated scenario candidates and the evaluation of the integrated scenario candidate are provided to a user through a monitor display.

5. The digital twin management system according to claim 4, wherein
the evaluation is given in terms of resource consumption and/or performance stability.

6. The digital twin management system according to claim 5, wherein
past data that has been used in the first scenario is used to calculate the evaluation.

7. The digital twin management system according to claim 6, wherein
selection from among the integrated scenario candidates is made in accordance with a prepared policy.

8. The digital twin management system according to claim 4, wherein
the evaluation includes resource consumption, performance stability, and a possible effect on a separated system related to the actual system.

9. The digital twin management system according to claim 8, wherein,
regarding an integrated scenario candidate selected by a user from among the integrated scenario candidates, information regarding a possible effect on the separate system is provided to the separate system and/or another system.

10. The digital twin management system according to claim 1, wherein
the actual system is an industrial apparatus that is used in a factory.

11. A digital twin management method that is a virtual model management method for managing a digital twin that represents an actual physical system in a virtual space by using a computer, wherein,
to add a second scenario to a first scenario, the computer
extracts multiple parts that can be used in common in the first scenario and the second scenario,
generates multiple candidates of an integrated scenario by changing the extracted parts that can be used in common,
calculates an evaluation of each of the generated integrated scenario candidates, and
outputs configuration information regarding each of the integrated scenario candidates and the evaluation of the integrated scenario candidate in association with each other.

* * * * *